United States Patent [19]
Adams

[11] 3,788,563
[45] Jan. 29, 1974

[54] COMMINUTER WITH HIGH SHEAR ROTOR AND STATOR

[75] Inventor: Robert E. Adams, Hudson, N.Y.

[73] Assignee: Columbia Precision Corporation, New York, N.Y.

[22] Filed: Feb. 2, 1972

[21] Appl. No.: 222,887

[52] U.S. Cl. .................................. 241/46.11, 241/261
[51] Int. Cl. ................................................. B02c 13/06
[58] Field of Search .... 241/45, 46.06, 46.11, 46.17, 241/110, 114, 115, 154, 188 R, 260, 261, 263

[56] References Cited
UNITED STATES PATENTS

| | | | |
|---|---|---|---|
| 279,390 | 6/1883 | Hyde............................ | 241/261 X |
| 1,977,955 | 10/1934 | Robinson...................... | 241/261 X |
| 2,273,405 | 2/1942 | Hoehn.......................... | 241/188 R |
| 2,679,981 | 6/1954 | Eisinga......................... | 241/261 X |
| 2,742,937 | 4/1956 | Herzer.......................... | 241/261 X |
| 2,851,256 | 9/1958 | Andreopaulos et al........ | 241/261 X |

Primary Examiner—Granville Y. Custer, Jr.
Attorney, Agent, or Firm—Gerald Altman et al.

[57] ABSTRACT

A comminuter, particularly for blending the components of liquid adhesives, includes an axial series of impeller blades rotating on a shaft at high speed, and a peripheral series of baffle teeth stationary among the impeller blades and clearing the impeller blades by small tolerances. The arrangement is such that an adhesive mixture of organic solvent and elastomeric solid, when fed through an axial input, is blended at high speed by the impeller blades and baffles for exit through a transverse outlet that is adjacent to the innermost of the impeller blades.

5 Claims, 5 Drawing Figures

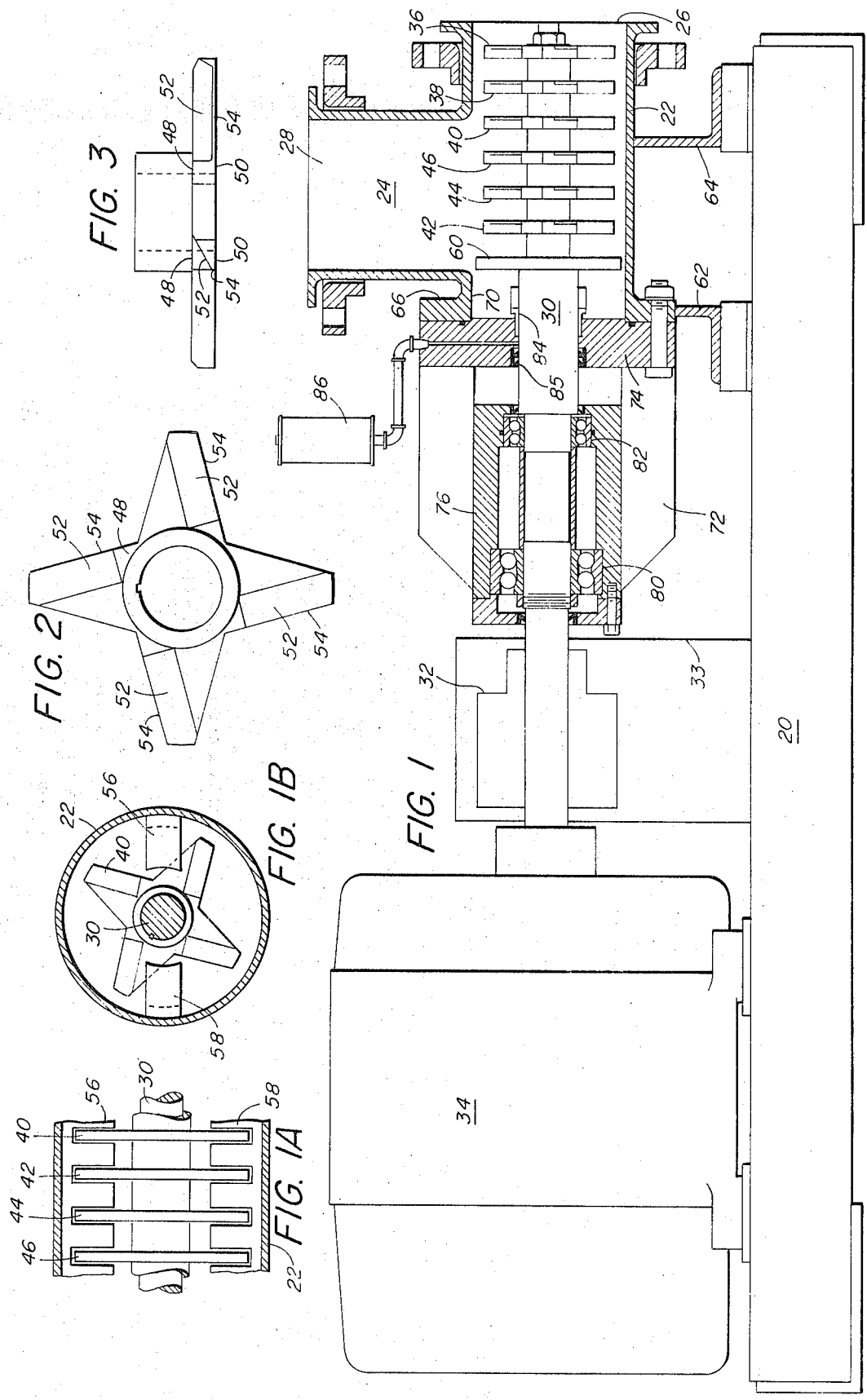

COMMINUTER WITH HIGH SHEAR ROTOR AND STATOR

BACKGROUND AND SUMMARY

The present invention relates to comminuters and, more particularly, to comminuters for solvating elastomeric materials in organic solvents.

Typically, adhesives of the type used on pressure sensitive tapes are produced by dissolving an elastomer such as rubber in a solvent such as toluene. The resulting solution is tacky but flowable. The main problem in the solvation of rubber has been the length of time required. Typically, chunks of rubber ranging from fist size to rice size are dumped into a large tank partially filled with solvent. Stirring at first causes rapid solvation but, as the solution becomes viscous and tacky, solvation of remaining solid rubber becomes more difficult. The comminuter of the present invention reduces the time of total solvation considerably by means of a novel sequence of shearing stages.

The primary object of the present invention is to provide a comminuter having a sequence of shearing stages that are characterized by the closely adjacent edges of successive blades of a rotor and successive teeth of a stator, the configuration of the blades being such as to impell a flow of liquid through the shearing stages from an axial inlet to a transverse outlet. Another object of the present invention is to utilize such a comminuter in a process for solvating an elastomer in a solvent.

Other objects of the present invention will in part be obvious and will in part appear hereinafter.

The invention accordingly comprises the apparatus and process, together with their components, steps and interrelationships, which are exemplified in the accompanying disclosure, the scope of which will be indicated in the appended claims.

BRIEF DESCRIPTION OF THE DRAWINGS

For a fuller understanding of the nature and objects of the present invention, reference is made to the following description taken in connection with the accompanying drawings, wherein:

FIG. 1 is a side view, partly in cross section, of an apparatus embodying the present invention;

FIG. 1A is a cross sectional view of a part of the device of FIG. 1, the section being taken horizontally along the axis of the shaft;

FIG. 1B is an end view, partly broken away, of the part of the device shown in FIG. 1A;

FIG. 2 is a front view of an impeller blade of the comminuter of FIG. 1; and

FIG. 3 is a side view of the impeller blade of FIG. 2.

DETAILED DESCRIPTION

The illustrated comminuter is a precision machine containing parts operating at high speed. This comminuter, as illustrated, is designed primarily for solvating rubber, but may be used in any similar application where shredding or chopping is required. This comminuter is useful in processing solids in liquid media but is not useful in processing dry solids.

As shown, the illustrated comminuter comprises a base 20 in the form of a steel plate, on which are mounted a comminuting head 22 having a L-shaped cavity 24 that is provided with an axially extending entrance port 26 and a transversely extending exit port 28. Projecting into cavity 24 is a shaft 30, the outer portion of which carries the impeller blades to be described below and the inner portion of which is connected through a coupling 32 to the output shaft of a motor 34. Coupling 32 is enveloped by a guard 33.

As is best shown in FIGS. 1A, 1B, 2, 3, the comminuter head includes six impellers 36, 38, 40, 42, 44, 46 each of which is keyed to shaft 30. Each impeller includes four radially extending blades. Each blade has a body portion having parallel faces 48, 50 and a wedge portion one face of which is a continuation of plane 50 and the other face of which defines an oblique surface 52. Each blade has a frustro-triangular profile, the leading and trailing edges of which converge outwardly from the shank and the outermost extremity of which defines a circular arc about the axis of the shaft. Oblique surface 52 is disposed in a plane at an angle ranging between 15° and 45°, preferably approximately 30°, with respect to the plane of face 50. It will be appreciated that as each blade orbits in the direction of its edge 54, i.e., clockwise as shown in FIG. 2, fluid is impelled from inlet 26 to outlet 28.

As shown in FIG. 1B, a pair of baffles 56, 58 are spaced 180° apart about the axis of shaft 30 substantially in a plane that includes the axis of the shaft and that is perpendicular to the axis of outlet port 28. Each baffle has teeth that project between blades 42, 44, between blades 44, 46 between blades 46, 40 between blades 40, 38, and between blades 38, 36.

The spacing between the adjacent edges of any tooth and plane 48 or plane 50 of any blade preferably ranges between 1 and 7 millimeters, the preferred gap being approximately 3 millimeters. Also, keyed to shaft 30 is a baffle 60 which rotates with shaft 30.

The arrangement is such that fluid material introduced at inlet port 26 is impelled by the rotation of the impeller blades into cavity 24 and its solid content is comminuted by the shearing action between the impeller blades and baffles 56, 58. The comminuted and blended material is pressured in the direction of outlet port 28 by the wedging action of impeller faces 52 of impeller blades 54.

As shown, body 22 is mounted on base 20 by a pair of legs 62, 64. Cavity 24 has a rearward axial opening 66 which is defined by a flange. Bolted to flange 66 is a mounting web 72 which includes a mounting flange 74, that is bolted to flange 66, and a bearing housing 76, through which shaft 30 projects and within which shaft 30 is journaled by bearings 80, 82. Coupling 32 joins shaft 30 to the output shaft of motor 34 mounted on base 20. Chamber 24 is isolated from the atmosphere by a mechanical seal 84. Seal 84 is lubricated under gravity from reservoir unit 86. The lubricant is retained by seals 85. By such lubrication, damage to the seal faces is avoided. It is imperative that the mixing chamber be flooded before the unit is operated. In addition, the unit must be throughly flushed with a clean liquid or solvent to free any excess material from the mechanical seal after each run. Three phase induction motor 34 typically operates at 3,600 revolutions per minute. It will be observed that the overall diameter of each impeller is at least three quarters of the overall diameter of the tubular cavity 70, of circular cross section, in which the impellers rotate. Baffle 60 is a circular disk that is larger in diameter than the impellers and that is disposed at the rearward extremity of outlet 28.

Outlet 28 is a tubular cavity of circular cross section and of the same diameter as inlet 26.

OPERATION

In operation, rotation of the impeller blades at 3,600 revolutions per minute imparts intense shearing to the solids portion of the medium and high pressure pumping of the medium as a whole. The arrangement is such that the shape of the blades causes development typically of a 35 foot discharge head with water and the arrangement of the baffles increase shearing and eliminate plugging.

EXAMPLE

In a typical prior installation, rubber was solvated in a 5 × 10 foot 1,400 gallon tank with the aid of a blender that comprised conventional rotating paddles. Solvation of a typical rubber cement took 24 hours. In contrast, the comminuter of the present invention reduced the solvation time for a like amount of rubber cement to 8 hours.

The present invention thus provides a novel comminuter capable, by virtue of interrelationships among impeller blades and baffles, of effectively and rapidly blending mixtures of organic solvents and elastomeric solids. Since certain changes may be made in the above disclosure without departing from the scope of the invention herein involved, it is intended that all matter described in the above specification and shown in the accompanying drawings be interperted in an illustrative and not in a limiting sense.

I claim:

1. A comminuter for blending the components of liquid adhesives, said comminuter comprising a base, a body defining a cavity having inlet along a generally transverse axis, a shaft rotatable in said cavity, the axis of said shaft being along the axis of said inlet, a bearing housing on said base remote from said inlet, said shaft being journaled for rotation at a sealed position in said bearing housing, a plurality of impellers mounted for rotation with said shaft within said cavity, said impellers being spaced from each other serially, each of said impellers having a plurality of blades each generally in the shape of a wedge, said impellers rotating in the direction of the free edges of said blades, and a plurality of stationary baffles, said baffles having teeth interpositioned among said impeller blades, whereby when a solid-liquid mixture is introduced into said inlet opening, it is comminuted by the shear generated between said impeller blades and said baffles and forced through said outlet port, the clearance between adjacent edges of said blades and teeth ranging between 1 and 7 millimeters, said shaft being unsupported at said inlet, each blade having a pair of parallel faces and an oblique face tapering to a leading edge, said parallel faces and said oblique face being planar, said blade rotating in the direction of said leading edge, the overall diameter of each impeller being at least three quarters of the overall diameter of said inlet, at least a plurality of said impeller blades being disposed in said inlet, the cavity in which said impellers rotate being essentially tubular with a circular cross section, said outlet being tubular cavity of the same diameter as said cavity in which said impellers rotate.

2. The comminuter of claim 1 wherein said cavity is L-shaped.

3. The comminuter of claim 1 wherein each blade has a frustro-triangular profile, the leading and trailing edges of which converge outwardly from the shank and the outermost extremity of which defines a circular arc about the axis of the shaft.

4. The comminuter of claim 1 wherein said oblique face is disposed in a plane at an angle ranging between 15° and 45° with respect to the plane of said face.

5. The comminuter of claim 1 wherein said baffles are arranged serially in pairs, each baffle of each pair being angularly spaced 180° apart about the axis of said shaft.

* * * * *